No. 855,477. PATENTED JUNE 4, 1907.
E. F. PRICE.
PROCESS OF PRODUCING CALCIUM CARBID.
APPLICATION FILED NOV. 14, 1905.
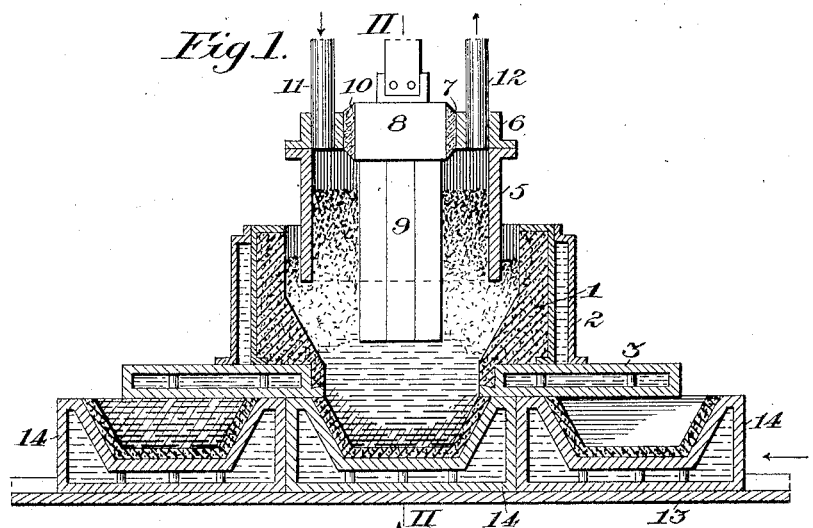
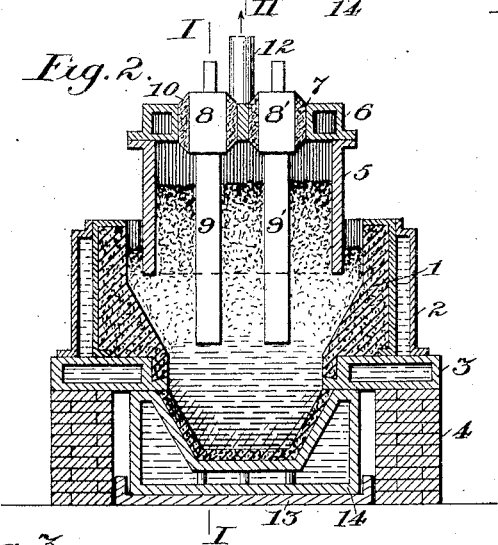
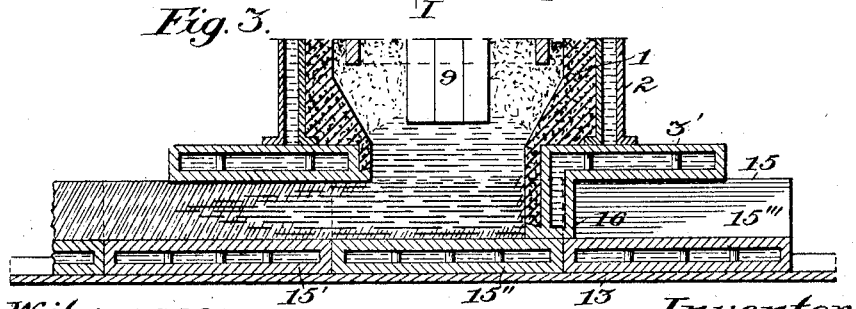
Witnesses: Inventor:
Edgar F. Price,
by Byrnes & Townsend
Att'ys.

UNITED STATES PATENT OFFICE.

EDGAR F. PRICE, OF NIAGARA FALLS, NEW YORK, ASSIGNOR TO UNION CARBIDE COMPANY, OF NIAGARA FALLS, NEW YORK, A CORPORATION OF VIRGINIA.

PROCESS OF PRODUCING CALCIUM CARBID.

No. 855,477.      Specification of Letters Patent.      Patented June 4, 1907.

Application filed November 14, 1905. Serial No. 287,341.

*To all whom it may concern:*

Be it known that I, EDGAR F. PRICE, a citizen of the United States, residing at Niagara Falls, in the county of Niagara and State of New York, have invented certain new and useful Improvements in Processes of Producing Calcium Carbid, of which the following is a specification.

U. S. Patents Numbers 750,096 and 760,312 to Alfred H. Cowles describe processes of producing calcium carbid by passing an electric current through a body of the charge, acting as a resistance conductor, melting the reduced carbid and running it out of the furnace through a tap-hole. It is not practicable to thus tap molten calcium carbid from an electric furnace unless it is either superheated or more heat is supplied to it at the tap-hole, its temperature of fusion being so high and the heat losses during its transit to and through the tap-hole being so great that it will otherwise become viscid or solid and clog the tap-hole. Calcium carbid has no definite melting point. When heated, it softens, becomes pasty and gradually liquefies. The difference between the temperatures of incipient liquefaction and complete fluidity is very great and when the carbid is heated to the temperature at which it will run through a tap-hole, it dissociates and the calcium distils off. Attempts have been made to lower the melting point of calcium carbid by fluxing it with or dissolving therein other substances, for instance calcium oxid. Such additions enable the carbid to be more readily tapped but render the product impure and uncommercial.

According to the present process, a charge of carbid-forming materials is electrically smelted, as by an electric arc, and the carbid is delivered into a receptacle which is shifted to withdraw its contents from the product remaining in the furnace. A series or chain of receptacles is preferably employed to receive the carbid, each receptacle serving in turn as the hearth or crucible of the electric furnace. When one of the receptacles is filled with pasty or molten carbid, it is moved laterally from beneath the smelting chamber and a duplicate receptacle is simultaneously moved into place.

A suitable arc furnace is shown in the accompanying drawing, in which—

Figure 1 is a longitudinal vertical section of the furnace on the line I—I of Fig. 2; Fig. 2 is a transverse vertical section on the line II—II of Fig. 1; and Fig. 3 is a longitudinal vertical section of the lower end of a furnace having a modified hearth.

The furnace shown in Figs. 1, 2 comprises a stationary, vertical smelting chamber having side walls 1 of refractory material such as magnesia or siloxicon firebrick, surrounded by a water-jacket 2. Beneath and supporting the firebrick is a base-plate 3, which preferably consists of a rectangular steel casting, containing a water chamber. This base-plate has a rectangular central opening which is in alinement with the downwardly-converging lower portion of the firebrick walls. The base-plate is supported on piers 4. Above the furnace and depending into the smelting chamber is a metal hood 5, the upper end of which is closed by a plate 6 having parallel openings 7 which receive the holders and terminals 8, 8, of the electrodes 9, 9'. A layer 10 of insulating refractory material is interposed between the electrode holders and the walls of the openings. Pipes 11, 12 for supplying the charge-materials and delivering the reaction-gases extend through the top-plate.

Beneath the smelting chamber and movably supported on a metal plate 13 having side flanges is a series of receptacles 14. Each of these receptacles preferably consists of a rectangular water-cooled steel casting having a refractory lining, which, when moved into alinement with the rectangular opening in the base-plate 3, constitutes the hearth or crucible of the furnace. The transverse adjacent edges of the several receptacles are in contact and the upper edges of the receptacles are flat and smooth and fit closely against the lower flat smooth face of the base-plate 3. In employing this furnace to carry out the process, the charge-materials are fed into the hood and thence into the working chamber and are smelted by electric arcs, as in the well known Horry furnace, the electrodes 9, 9' being of opposite polarity. The reduced carbid gradually accumulates in the receptacle 14 which is beneath the smelting chamber and when this receptacle is filled, it is moved out from beneath the furnace and the adjacent receptacle is simultaneously moved into position to receive another body of carbid. The filled receptacles are discharged as they leave the furnace, as by inverting them, and are then ready for further use. The movement of the receptacles may be effected either by applying pressure to the empty receptacle at one end of the series, or by connecting the several receptacles and applying traction to the filled receptacle at the other end of the series. If desired, the receptacles may constitute an endless chain.

Fig. 2 shows the lower end of a furnace which is identical in its general construction with that of Figs. 1, 2, but which has a hearth consisting of an open trough 15, divided transversely into a number of abutting sections. The sections are arranged to slide on a bed-plate 13, with the flat upper faces of their sides in contact with the lower face of the furnace base-plate 3'. The sections preferably have cooling chambers and may be lined, like the pan-hearths 14. A transverse water-cooled dam or partition 16 depends from the base-plate 3' and makes close contact with the bottom and sides of the trough-sections, thereby preventing the molten furnace-product from flowing into the incoming section 15'''.

In operation, the row of abutting trough-sections is either continuously or intermittently moved along the bed-plate and beneath the open bottom of the furnace, and the molten or pasty product flows into and fills the trough. The product in the outgoing section 15' solidifies or becomes sufficiently rigid to prevent leakage from the furnace. As each filled section leaves the furnace, its contents is broken or cut off from that in the succeeding section and it is then emptied and transferred to the rear of the line of sections.

I claim:—

1. The process of producing calcium carbid, which consists in smelting the charge, accumulating a body of carbid, a portion of said body lying within a movable receptacle and a portion within the smelting chamber, and shifting the receptacle and thereby withdrawing its contents from the portion remaining in the furnace, as set forth.

2. The process of producing calcium carbid, which consists in smelting the charge, accumulating a body of carbid, a portion of said body lying within a movable receptacle and a portion within the smelting chamber, shifting the receptacle and thereby withdrawing its contents from the portion remaining in the furnace, and moving an empty receptacle into position, as set forth.

3. The process of producing calcium carbid, which consists in progressively smelting the charge, accumulating a body of carbid, a portion of said body lying within a movable receptacle and a portion within the smelting chamber, shifting the receptacle and thereby withdrawing its contents from the portion remaining in the furnace, moving an empty receptacle into position, and supplying charge-materials as required, as set forth.

4. The process of producing calcium carbid, which consists in smelting the charge by an electric arc, accumulating a body of carbid, a portion of said body lying within a movable receptacle and a portion within the smelting chamber, and shifting the receptacle and thereby withdrawing its contents from the portion remaining in the furnace, as set forth.

5. The process of producing calcium carbid, which consists in smelting the charge by an electric arc, accumulating a body of carbid, a portion of said body lying within a movable receptacle and a portion within the smelting chamber, shifting the receptacle and thereby withdrawing its contents from the portion remaining in the furnace, and moving an empty receptacle into position, as set forth.

6. The process of producing calcium carbid, which consists in progressively smelting the charge by an electric arc, accumulating a body of carbid, a portion of said body lying within a movable receptacle and a portion within the smelting chamber, shifting the receptacle and thereby withdrawing its contents from the portion remaining in the furnace, moving an empty receptacle into position, and supplying charge-materials as required, as set forth.

In testimony whereof, I affix my signature in presence of two witnesses.

EDGAR F. PRICE.

Witnesses:
G. E. Cox,
D. Burgess.